US010547606B2

(12) United States Patent
Mino

(10) Patent No.: US 10,547,606 B2
(45) Date of Patent: Jan. 28, 2020

(54) INFORMATION PROCESSING APPARATUS, SECURITY SYSTEM, AND NON-TRANSITORY COMPUTER READABLE MEDIUM

(71) Applicant: FUJI XEROX CO., LTD., Tokyo (JP)

(72) Inventor: Koichiro Mino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 214 days.

(21) Appl. No.: 15/589,113

(22) Filed: May 8, 2017

(65) Prior Publication Data

US 2018/0026967 A1 Jan. 25, 2018

(30) Foreign Application Priority Data

Jul. 22, 2016 (JP) ................................. 2016-144277

(51) Int. Cl.
*H04L 29/06* (2006.01)
*H04W 88/02* (2009.01)
*H04W 88/08* (2009.01)

(52) U.S. Cl.
CPC ........ *H04L 63/0823* (2013.01); *H04L 63/105* (2013.01); *H04W 88/02* (2013.01); *H04W 88/08* (2013.01)

(58) Field of Classification Search
CPC .................................................. H04L 63/0823
USPC ........................................................... 726/6
See application file for complete search history.

(56) References Cited

U.S. PATENT DOCUMENTS

| 8,869,259 B1* | 10/2014 | Udupa | H04L 63/0823 726/10 |
| 2002/0053020 A1* | 5/2002 | Teijido | H04L 63/0209 713/153 |
| 2003/0140252 A1* | 7/2003 | Lafon | H04L 9/006 726/10 |
| 2005/0069136 A1* | 3/2005 | Thornton | H04L 63/0823 380/277 |
| 2009/0222902 A1* | 9/2009 | Bender | H04L 63/0823 726/10 |
| 2018/0007033 A1* | 1/2018 | Ajitomi | H04L 63/0442 |
| 2018/0205717 A1* | 7/2018 | Zou | H04L 63/08 |

FOREIGN PATENT DOCUMENTS

| JP | 2004-037829 A | 2/2004 |
| JP | 2009-093454 A | 4/2009 |

\* cited by examiner

*Primary Examiner* — Khalil Naghdali
(74) *Attorney, Agent, or Firm* — Oliff PLC

(57) ABSTRACT

An information processing apparatus includes a signing unit and first and second obtaining units. The signing unit signs a document by using a certificate used for connecting to an access point. The document is obtained via the access point. The first obtaining unit obtains, in response to an access request to access the signed document, identification information concerning the certificate used for signing the signed document. The second obtaining unit obtains identification information concerning a certificate used for connecting to an access point when the access request is received. The display controller performs control so that the sighed document will be displayed if the identification information obtained by the first obtaining unit and the identification information obtained by the second obtaining unit coincide with each other.

2 Claims, 6 Drawing Sheets

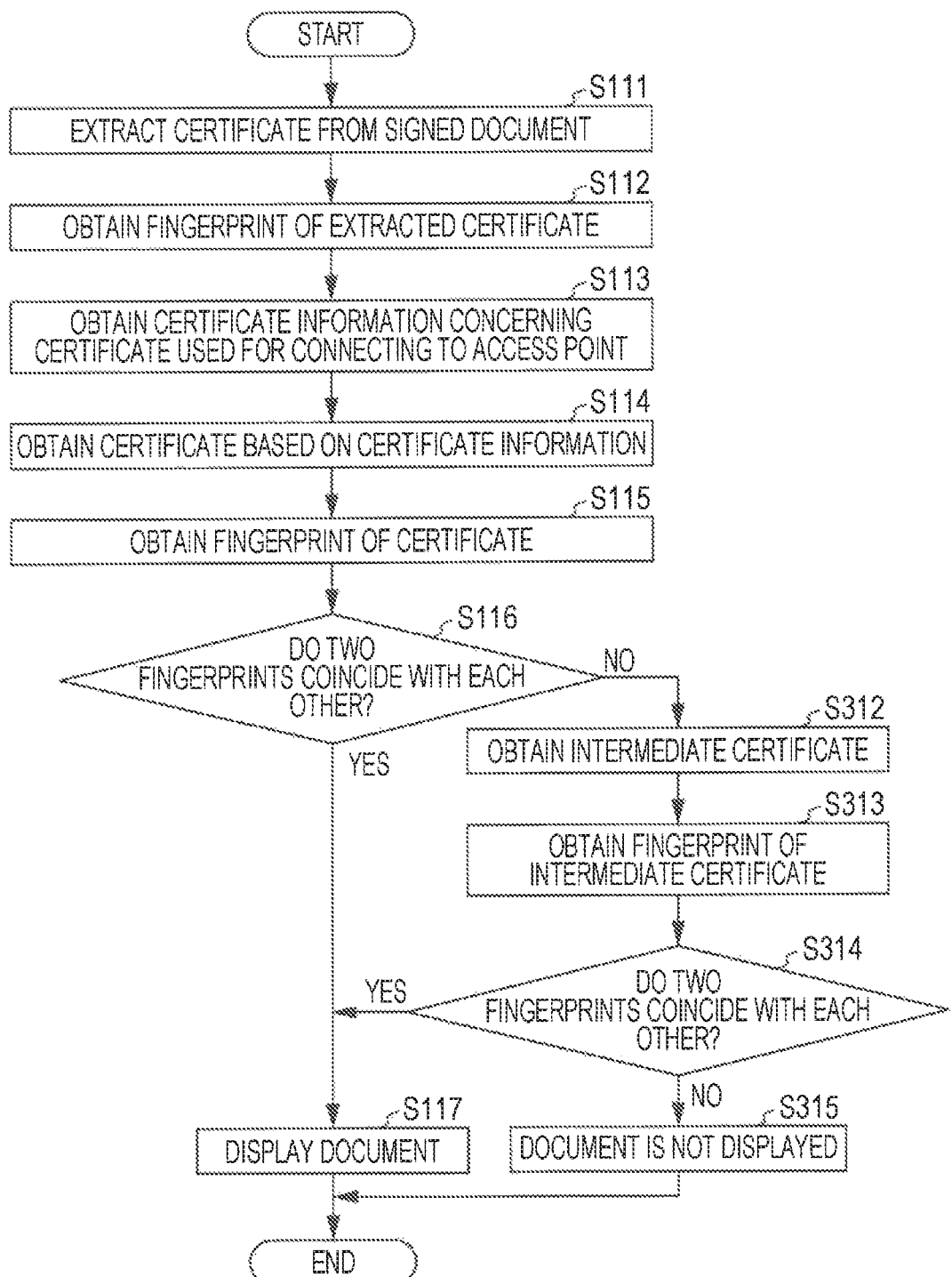

INFORMATION PROCESSING APPARATUS, SECURITY SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-144277 filed Jul. 22, 2015.

BACKGROUND

(i) Technical Field

The present invention relates to an information processing apparatus, a security system, and a non-transitory computer readable medium.

(ii) Related Art

To take security measures for the use of a mobile terminal within a company, access to documents and data is often restricted by using a combination of a digital certificate and a user name and a password. However, if an authenticated user logs in to make a copy of confidential information onto a mobile terminal and takes it outside the company, a leakage of this confidential information may occur.

SUMMARY

According to an aspect of the invention, there is provided an information processing apparatus including a signing unit and first and second obtaining units. The signing unit signs a document by using a certificate used for connecting to an access point. The document is obtained via the access point. The first obtaining unit obtains, in response to an access request to access the signed document, identification information concerning the certificate used for signing the signed document. The second obtaining unit obtains identification information concerning a certificate used for connecting to an access point when the access request is received. The display controller performs control so that the signed document will be displayed if the identification information obtained by the first obtaining unit and the identification information obtained by the second obtaining unit coincide with each other.

BRIEF DESCRIPTION OF THE DRAWINGS

Exemplary embodiments of the present invention will be described in detail based on the following figures, wherein:

FIG. 7 is a flowchart illustrating document display processing in the third exemplary embodiment.

DETAILED DESCRIPTION

Exemplary embodiments of the present invention will be described below with reference to the accompanying drawings.

First Exemplary Embodiment

Figure 1:
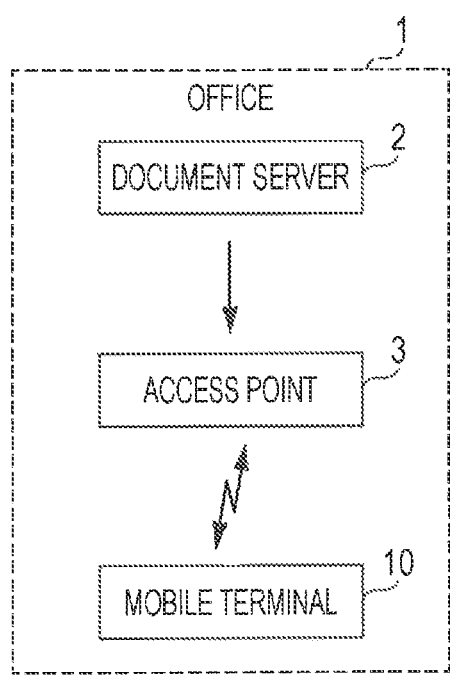
FIG. 1 is a schematic diagram illustrating a security system according to a first exemplary embodiment of the present invention.

FIG. 1 is a schematic diagram illustrating a security system according to a first exemplary embodiment of the present invention. FIG. 1 shows a document server 2, an access point 3, and a mobile terminal 10 disposed within a facility of an office 1. The access point 3 constructs a wireless local area network (LAN) in the office 1 and connects the document server 2 and the mobile terminal 10 so that they can communicate with each other. In the first exemplary embodiment, a user authentication system using digital certificates is implemented in the access point 3. The access point 3 connects the mobile terminal 10 wirelessly. The access point. 3 may connect the document server 2 via a wired or wireless medium. Although in the first exemplary embodiment the access point 3 is used as a device which constructs a wireless LAN, another device, such as a wireless LAN router, may be used. The wireless LAN router may be operated as an access point by loading a wireless access point function thereinto. The use of a router enables the mobile terminal 10 to communicate with the document server 2 via the Internet.

The mobile terminal 10 is a mobile information processing apparatus. The first exemplary embodiment will be described, assuming that the mobile terminal 10 is a tablet terminal. However, the mobile terminal 10 is not restricted to a tablet terminal, and may be a computer, such as a mobile personal computer (PC). The first exemplary embodiment may also be applicable to a computer which is not mobile and is used only in the office 1.

Figure 2:
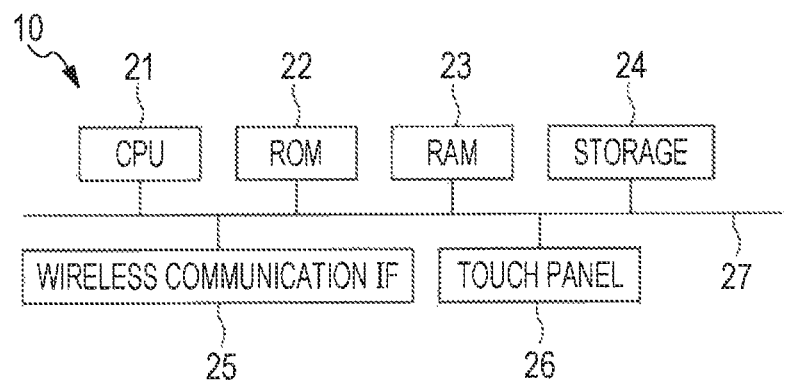
FIG. 2 is a block diagram of the hardware configuration of a mobile terminal in the first exemplary embodiment.

FIG. 2 is a block diagram of the hardware configuration of the mobile terminal 10 in the first exemplary embodiment. Elements which are not used for a description of the first exemplary embodiment are not shown in FIG. 2. In the first exemplary embodiment, the mobile terminal 10 has a built-in computer. The mobile terminal 10 may be implemented by a known general hardware configuration. As shown in FIG. 2, the mobile terminal 10 includes a central processing unit (CPU) 21, a read only memory (ROM) 22, a random access memory (RAM) 23, a storage 24, a wireless communication interface (IF) 25 which performs wireless communication with a router, and a touch panel 25 provided as a user interface. These elements are connected to an internal bus 27.

Figure 3:
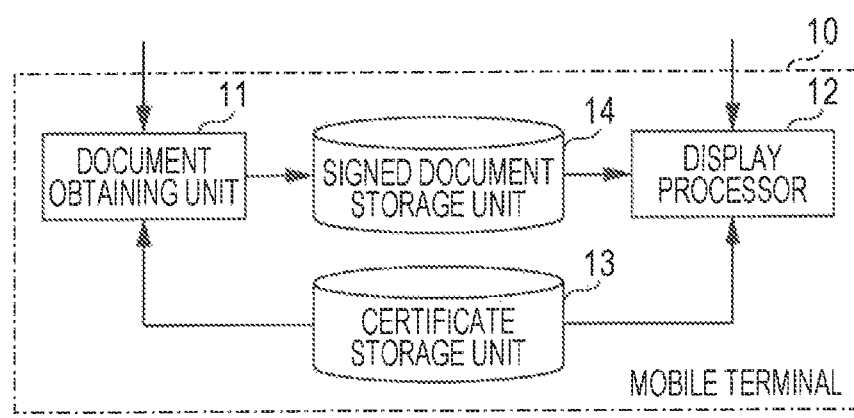
FIG. 3 is a block diagram of the functional configuration of the mobile terminal in the first exemplary embodiment.

FIG. 3 is a block diagram of the functional configuration of the mobile terminal 10 in the first exemplary embodiment. Elements which are not used for a description of the first exemplary embodiment are not shown in FIG. 3. The mobile terminal 10 includes a document obtaining unit 11, a display processor 12, a certificate storage unit 13, and a singed document storage unit 14. The document obtaining unit 11 obtains a document specified by a user from the document server 2 via the access point 3. The document obtaining unit 11 of the first exemplary embodiment also serves as a signing unit, and signs an obtained document by using a certificate used for connecting to the access point 3 and stores the signed document in the signed document storage unit 14. The display processor 12 serves as first and second obtaining units and a display controller. The first obtaining unit obtains, in response to an access request to access a signed document, identification information concerning a certificate used for signing this document. The second obtaining unit obtains identification information concerning a certificate used for connecting to the access point 3 when the access request is received. The display controller performs control so that the signed document will be displayed if the identification information obtained by the first obtaining unit and that by the second obtaining unit coincide with each other.

In the first exemplary embodiment, a fingerprint is used as identification information of a certificate, "A fingerprint" is data which certifies that a digital certificate is not tampered with and is also identification information which certifies the uniqueness of the certificate. More specifically, a fingerprint is a hash value obtained by applying a hash function to a document.

In the certificate storage unit 13, a certificate used for connecting to the access point 3 is stored in advance. In the first exemplary embodiment, as this certificate, a user certificate is used. "A user certificate" is a digital certificate issued to an individual user, and is issued and obtained as a result of the user of the mobile terminal 10 applying for a certificate. In the first exemplary embodiment, a user certificate issued in the office 1 to connect to the access point 3 installed in the office 1 is stored in the certificate storage unit 13. The certificate may actually be installed in an operating system (OS), but it is assumed to be stored in the certificate storage unit 13 for the sake of description in the first exemplary embodiment.

The document obtaining unit 11 and the display processor 12 of the mobile terminal 10 are implemented as a result of the computer built in the mobile terminal 10 operating together with a program operating on the CPU 21 of the computer. The certificate storage unit 13 and the singed document storage unit 14 are implemented by the storage 24 of the mobile terminal 10. Alternatively, the RAM 23 may be used or an external memory may be used via a network.

The program used in the first exemplary embodiment may be provided by a communication medium, or may be stored in a computer readable recording medium, such as a compact disc-read only memory (CD-ROM) or a universal serial bus (USB) memory, and be provided. The program provided by a communication medium or a recording medium is installed into the computer, and as a result of the CPU 21 of the computer sequentially executing the program, various operations are implemented.

Operations in the first exemplary embodiment will now be described below. Processing for obtaining a document from the document server 2 by the user of the mobile terminal 10 will first be discussed.

When the user approaches the access point 3, the mobile terminal 10 logs in the access point 3 and connects to it by using a user certificate which has been obtained in advance. The mobile terminal 10 performs this operation automatically or as a result of the user selecting the access point 3. This processing is executed as in the related art.

The user then specifies a document stored in the document server 2 and performs a predetermined operation to provide an instruction to obtain this document. In response to this instruction from the user, the document obtaining unit 11 obtains the document, signs the document by using a certificate used for connecting to the access point 3, that is, the user certificate in the first exemplary embodiment, and stores the document in the signed document storage unit 14.

Figure 4:
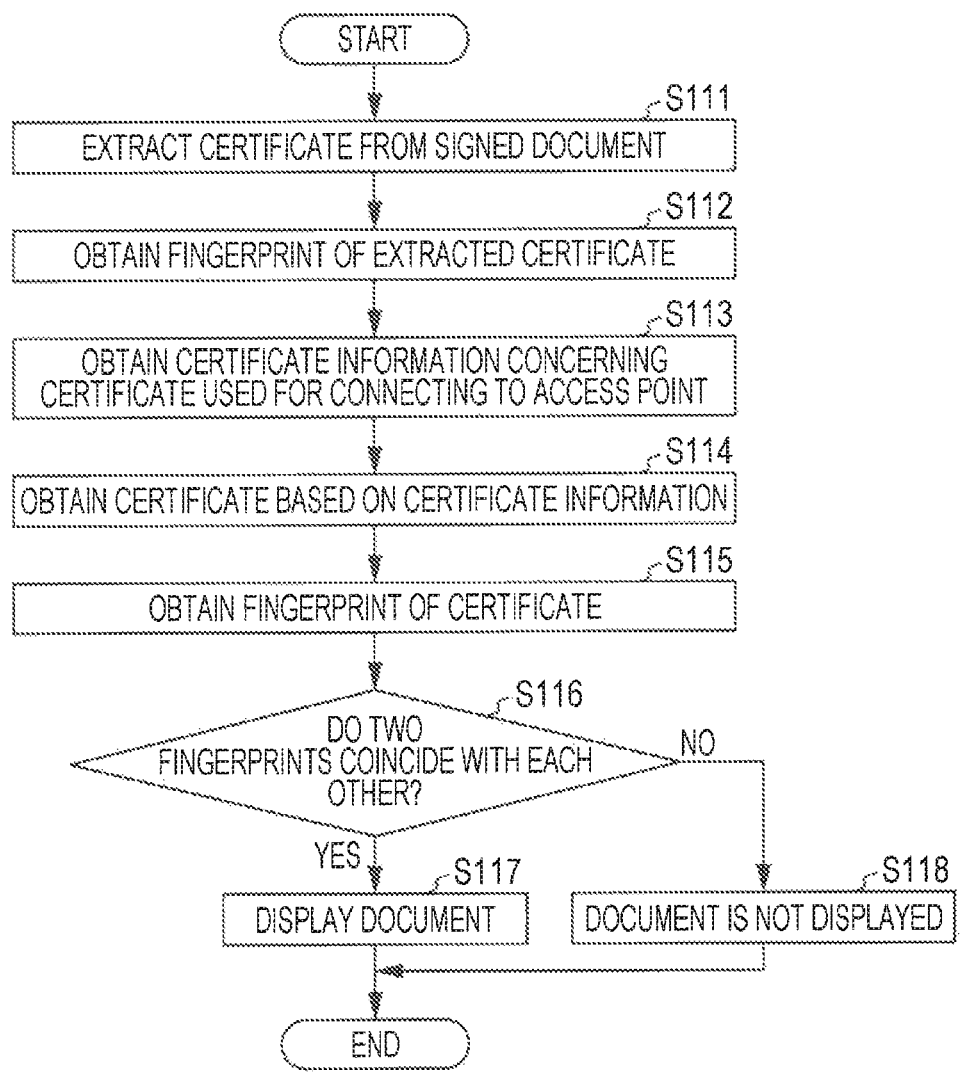
FIG. 4 is a flowchart illustrating document display processing in the first exemplary embodiment.

Processing for displaying a document in response to an access request to access a document obtained from the document server 2 from the user, in this case, a request to read a document, will now be discussed below with reference to the flowchart in FIG. 4. It is assumed that the user is currently in the office 1 and the mobile terminal 10 is connected to the access point 3.

In response to a request to read a signed document from a user performing a predetermined operation, in step S111, the display processor 12 reads the specified document from the signed document storage unit 14 and extracts a certificate used for signing this document. Then, in step S112, the display processor 12 obtains a fingerprint of the extracted certificate. If it is possible to obtain a fingerprint of the certificate without extracting the certificate from the signed document, extracting of the certificate from the signed document in step S111 may be omitted.

Then, in step S113, the display processor 12 obtains certificate information concerning a certificate used for connecting to the access point 3 from the service set identifier (SSID) of the access point 3. The certificate information includes information for uniquely specifying the certificate used for connecting to the access point 3. In step S114, the display processor 12 refers to this certificate information so as to specify the certificate used for connecting to the access point 3, and reads this certificate from the certificate storage unit 13. Then, in step S115, the display processor 12 obtains the fingerprint of the read certificate. In the first exemplary embodiment, processing for obtaining a fingerprint from a signed document is first executed. However, processing for obtaining a fingerprint from the certificate storage unit 13 may first be executed. Alternatively, two operations may be executed in parallel. If it is possible to obtain a fingerprint of the certificate read from the certificate storage unit 13 without extracting the certificate from the certificate storage unit 13, extracting of the certificate from the certificate storage unit 13 in step S114 may be omitted.

In this manner, the fingerprint of the signed document and the fingerprint of the certificate stored in the certificate storage unit 13 are obtained. The display processor 12 then determines in step S116 whether the two fingerprints coincide with each other. If the two fingerprints coincide with each other (the result of step S116 is YES), the document is displayed on the touch panel 26 in step S117. If the two fingerprints do not coincide with each other (the result of step S116 is NO), the document is not displayed in step S118. In this case, information that the user does not have an access right to this document may be displayed on the touch panel 26.

If the two fingerprints coincide with each other in step S116, it means that the user has made a request to read the document in the office 1 where the document has been signed. More specifically, the signed document has been generated as a result of signing this document by using the user certificate issued in the office 1, and the fingerprint of this user certificate is compared with the fingerprint of a certificate specified from certificate information obtained from an access point which is currently connecting to the mobile terminal 10 of the user. That is, if the certificate information is obtained from the access point 3 installed in the office 1, the two fingerprints coincide with each other. In contrast, if the mobile terminal 10 connects to an access point other than the access point 3 in the office 1 and obtains certificate information from this access point, the certificate specified from this certificate information is not the user certificate issued by the office 1. Thus, the two fingerprints do not coincide with each other.

As described above, if the user takes the mobile terminal 10 outside the office 1 and accesses an access point installed somewhere else other than in the office 1, the two fingerprints do not coincide with each other, and the requested document is not displayed. As a result, a leakage of confidential information concerning a confidential document is prevented.

In the first exemplary embodiment, when two fingerprints do not coincide with each other, a requested document is not displayed. Alternatively, a requested document may be deleted. Deletion of a requested document may also be performed in second and third exemplary embodiments.

Second Exemplary Embodiment

Figure 5:
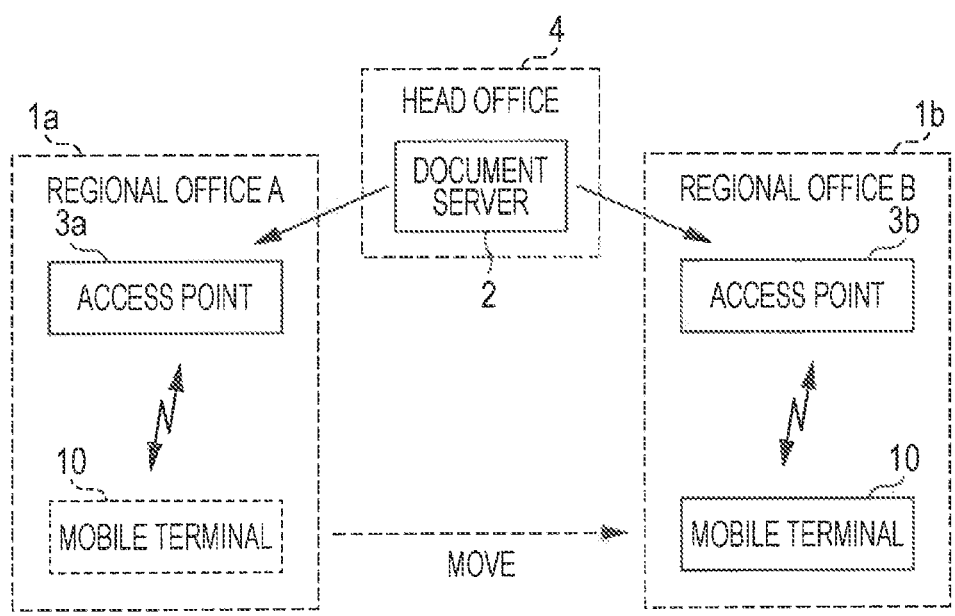
FIG. 5 is a schematic diagram illustrating a security system according to a second exemplary embodiment of the present invention.

FIG. 5 is a schematic diagram illustrating a security system according to a second exemplary embodiment of the present invention, FIG. 5 illustrates a head office 4 of a company, which is one mode of an organization and a regional office A 1a (hereinafter simply called the office A) and a regional office B 1b (hereinafter simply called the office B). In the first exemplary embodiment, the security system is applied to a single office. In the second exemplary embodiment, the security system is applied to a company having plural offices as facilities. In the office A, an access point 3a is installed. The access point 3a constructs a wireless network, and connects a document server 2 and a mobile terminal 10 so that they can communicate with each other. Similarly, in the office B, an access point 3b is installed. The access point 3b constructs a wireless network, and connects the document server 2 and the mobile terminal 10 so that they can communicate with each other. The access points 3a and 3b have functions similar to those of the access point 3 in the first exemplary embodiment.

The document server 2 is installed in the head office 4. The connection mode of the document server 2 to the mobile terminal 10 via the access points 3a and 3b is not restricted to a particular mode. However, by considering that the document server 2 manages confidential documents, a virtual private network (VPN) may suitably be used for connecting the document server 2 to the mobile terminal 10. Although in the second exemplary embodiment the document server 2 is installed in the head office 4, it may be installed in the office A or B, or a certain location in the company. The hardware configuration and the functional configuration of the mobile terminal 10 in the second exemplary embodiment may be the same as those in the first exemplary embodiment. However, in the certificate storage unit 13 in the second exemplary embodiment, as certificates used for connecting to the access points 3a and 3b, a user certificate issued in the office A (hereinafter called "the user certificate A"), a user certificate issued in the office B (hereinafter called "the user certificate B"), and an intermediate certificate are stored in advance. The intermediate certificate is a digital certificate issued for each organization, and is issued as a result of an organization, a company in the second exemplary embodiment, requesting an intermediate certificate authority. The intermediate certificate also has a function of certifying a user certificate issued in an organization.

Operations in the second exemplary embodiment will now be described below. Processing for obtaining a document from the document server 2 by the user of the mobile terminal 10 will first be discussed.

The document obtaining unit 11 obtains a document from the document server 2 in response to a request from the user within a facility of the office A. This processing is the same as that in the first exemplary embodiment, and an explanation thereof will thus be omitted. In the second exemplary embodiment, however, the mobile terminal 10 signs the obtained document, not by using the user certificate A used for connecting to the access point 3a, but by using a higher certificate, that is, the intermediate certificate for certifying the user certificate A.

Then, the user moves from the office A to the office B processing for displaying a document in response to a request from the user to read a document obtained from the document server 2 in the office B will now be discussed below with reference to the flowchart in FIG. 4. This processing is the same as that in the first exemplary embodiment illustrated in FIG. 4, and an explanation thereof will partially be omitted. The user is currently in the office B, and the mobile terminal 10 uses the user certificate B to connect to the access point 3b.

In response to a request to read a signed document from the user, the display processor 12 reads the document from the signed document storage unit 14 and extracts a certificate used for singing this document in step S111. Then, in step S112, the display processor 12 obtains a fingerprint of the extracted certificate.

Then, the display processor 12 refers to certificate information obtained from the access point 3b in step S113 so as to obtain the user certificate B. Then, in step S114, the display processor 12 reads the intermediate certificate for certifying the user certificate B from the certificate storage unit 13. Then, in step S115, the display processor 12 obtains the fingerprint of the intermediate certificate.

The display processor 12 then determines in step S116 whether the fingerprint obtained from the signed document and that from the certificate storage unit 13 coincide with each other. If the two fingerprints coincide with each other (the result of step S116 is YES), the document is displayed in step S117. If the two fingerprints do not coincide with each other (the result of step S116 is NO), the document is not displayed in step S118.

As discussed above, if the document is signed by using the intermediate certificate and if the intermediate certificate for certifying the user certificate B used for connecting to the access point 3b is used for verifying an access request, the two fingerprints coincide with each other. That is, in the second exemplary embodiment, the user can read a document obtained in the office A in the office B. When the user remains in the office A and makes a request to read a document, the two fingerprints also coincide with each other. In contrast, if the mobile terminal 10 connects to an access point other than the access point 3a in the office A or the access point 3b in the office B and obtains certificate information from this access point, the intermediate certificate originating from this certificate information is not the intermediate certificate issued by this company. Thus, the two fingerprints do not coincide with each other. In this manner, if the user takes the mobile terminal 10 outside the office A or B and accesses an access point installed somewhere else other than in the company, a document requested by the user is not displayed. As a result, a leakage of confidential information concerning a confidential document is prevented.

Third Exemplary Embodiment

A third exemplary embodiment is different from the second exemplary embodiment in that the level of confidentiality of a document is also taken into account. The configuration of a security system and the hardware configuration and the functional configuration of a mobile terminal 10 in the third exemplary embodiment are the same as those of the second exemplary embodiment, and an explanation thereof will thus be omitted. However, a document server 2 in the third exemplary embodiment manages documents and the confidentiality level of each document.

Figure 6:
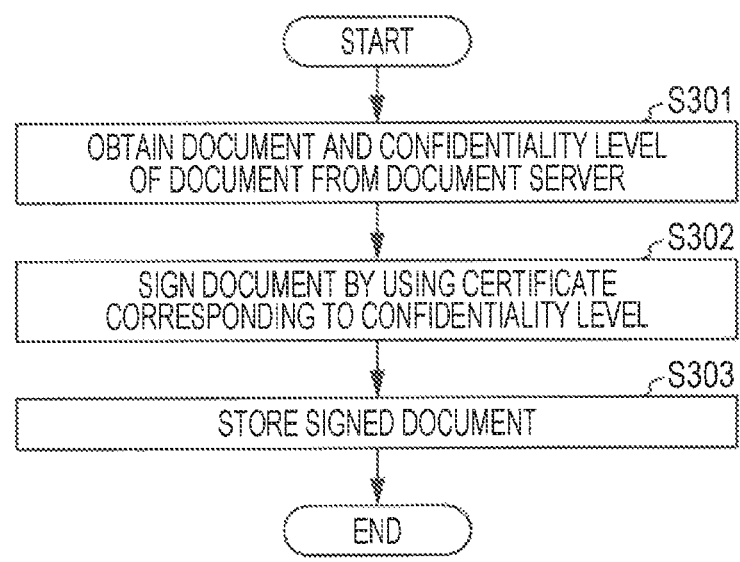
FIG. 6 is a flowchart illustrating document obtaining processing in a third exemplary embodiment.

Processing for obtaining a document from the document server 2 by the user of the mobile terminal 10 will first be discussed with reference to the flowchart in FIG. 6.

In response to a request to obtain a document from the user within a facility of the office A, in step S301, the document obtaining unit 11 obtains the document from the document server 2 as in the second exemplary embodiment. In the third exemplary embodiment, the document obtaining unit 11 also obtains the confidentiality level of the document.

Then, in step S302, the document obtaining unit 11 checks the confidentiality level of the document, and signs the document by using a certificate which corresponds to the confidentiality level. In step S303, the document obtaining unit 11 stores the document in the signed document storage unit 14.

In the third exemplary embodiment, two certificates, that is, a user certificate and an intermediate certificate, are used as certificates, and two levels of confidentiality are set in accordance with these certificates. The user certificate A is used for signing a document having a higher confidentiality level, while the intermediate certificate is used for signing a document having a lower confidentiality level.

Then, the user moves from the office A to the office B. Processing for displaying a document in response to a request from the user to read a document obtained from the document server 2 in the office B will now be discussed below with reference to the flowchart in FIG. 7. The same operations as those in FIG. 4 are designated by like step numbers, and an explanation thereof will partially be omitted.

In response to a request to read a signed document from the user, the display processor 12 reads the document from the signed document storage unit 14 and extracts a certificate used for signing this document in step S111. Then, in step S112, the display processor 12 obtains a fingerprint of the extracted certificate.

Then, the display processor 12 refers to certificate information obtained from the access point 3b in step S113. Then, in step S114, the display processor 12 reads the user certificate B from the certificate storage unit 13 based on the certificate information. Then, in step S115, the display processor 12 obtains the fingerprint of the user certificate B.

The display processor 12 then determines in step S116 whether the fingerprint obtained from the signed document and that from the certificate storage unit 13 coincide with each other. If the two fingerprints coincide with each other (the result of step S116 is YES), the document is displayed in step S117. If the two fingerprints do not coincide with each other (the result of step S116 is NO), the process proceeds to step S312. In the third exemplary embodiment, the document is signed by using the user certificate A or the intermediate certificate, and the fingerprint obtained based on the certificate information is that of the user certificate B. Thus, the two fingerprints do not coincide with each other. If the user remains in the office A and makes a request to read a document and if the document is signed by using the user certificate A, the two fingerprints coincide with each other in step S116. Then, the document is displayed in step S117.

If the two fingerprints do not coincide with each other (the result of step S116 is NO), the process proceeds to step S312. In step S312, the display processor 12 obtains the intermediate certificate for certifying the user certificate B obtained in step S114 from the certificate storage unit 13. Then, in step S313, the display processor 12 obtains the fingerprint of the intermediate certificate.

The display processor 12 then determines in step S314 whether the fingerprint obtained from the signed document and that from the certificate storage unit 13 coincide with each other. If the two fingerprints coincide with each other (the result of step S314 is YES), the document is displayed in step S117. If the two fingerprints do not coincide with each other (the result of step S314 is NO), the document is not displayed in step S315. In the third exemplary embodiment, if the document is signed by using the intermediate certificate, it is displayed. If the document is signed by using the user certificate A, it is not displayed.

As described above, in the third exemplary embodiment, the certificate used for signing a document is different in accordance with the confidentiality level of the document. If the confidentiality level of a document is low, the document is signed by using the intermediate certificate, and it can be displayed in the office B, as in the second exemplary embodiment. In contrast, if the confidentiality level of a document is high, the document is signed by using the user certificate A, and thus, it is not displayed in the office B and can be read only in the office A. In response to a request to read a document from the user connecting to an access point other than the access point 3a installed in the office A or the access point 3b in the office B, the document is not displayed. As a result, a leakage of confidential information concerning a confidential document is prevented.

The second and third exemplary embodiments have been discussed through illustration of a company having two regional offices by way of example. The invention may also be applicable to a company having three or more regional offices. Additionally, document access control is performed in two levels by using a user certificate and an intermediate certificate. The invention may also be applicable to a security system which performs document access control in three or more levels, in which case, the intermediate certificate may be divided into hierarchical levels.

The second and third exemplary embodiments have been discussed through illustration of a company as an organization. The invention may also be applicable to various other organizations, such as nonprofit organizations and associations.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A security system comprising:
   a document server that manages documents and a confidentiality level of each of the documents;
   a first wireless network constructed within a first facility of an organization and including a first access point;
   a second wireless network constructed within a second facility of the organization and including a second access point; and a mobile information processing apparatus,
the mobile information processing apparatus configured with a memory and processor that are configured to:
- store a first user certificate that certifies when a user is within the first facility;
- store a second user certificate that certifies when a user is within the second facility, and store an intermediate certificate certifying the organization;
- obtain, within the first facility, a document and a confidentiality level of the document from the document server via the first access point and sign the document by using one of the first user certificate and the intermediate certificate which corresponds to the confidentiality level of the document;
- obtain, within the second facility, in response to an access request to access the signed document, first identification information concerning one of the first user certificate and the intermediate certificate used for signing the signed document;
- obtain, within the second facility, second identification information concerning a certificate used for connecting to the second access point when the access request is received;
- display via a display controller the signed document as a result of determining that the first identification information and the second identification information coincide with each other;
- sign the document by using the first user certificate as a result of determining that the confidentiality level of the document indicates that access is permitted only within the first facility;
- sign the document by using the second user certificate as a result of determining that the confidentiality level of the document indicates that access is permitted only within the second facility; and
- sign the document by using the intermediate certificate as a result of determining that the confidentiality level of the document indicates that access is permitted only within the organization.

2. A non-transitory computer readable medium storing a program causing a computer to execute a process, the computer being installed in a mobile information processing apparatus in a security system, the security system including a document server that manages documents and a confidentiality level of each of the documents, a first wireless network constructed within a first facility of an organization and including a first access point, and a second wireless network constructed within a second facility of the organization and including a second access point, and the mobile information processing apparatus, the mobile information processing apparatus including a storage unit that stores a first user certificate for certifying a user within the first facility, a second user certificate for certifying a user within the second facility, and an intermediate certificate for certifying the organization, the process comprising:
- obtaining, within the first facility, a document and a confidentiality level of the document from the document server via the first access point and signing the document by using one of the first user certificate and the intermediate certificate which corresponds to the confidentiality level of the document;
- obtaining within the second facility, in response to an access request to access the signed document, first identification information concerning one of the first user certificate and the intermediate certificate used for signing the signed document;
- obtaining, within the second facility, second identification information concerning a certificate used for connecting to the second access point when the access request is received;
- performing control so that the signed document will be displayed as a result of determining that the first identification information and the second identification information coincide with each other;
- signing the document by using the first user certificate as a result of determining that the confidentiality level of the document indicates that access is permitted only within the first facility;
- signing the document by using the second user certificate as a result of determining that the confidentiality level of the document indicates that access is permitted only within the second facility; and
- signing the document by using the intermediate certificate as a result of determining that the confidentiality level of the document indicates that access is permitted only within the organization.

* * * * *